(12) United States Patent
Maschhoff

(10) Patent No.: US 10,516,854 B2
(45) Date of Patent: Dec. 24, 2019

(54) UNDERWATER CAMERA ASSEMBLY

(71) Applicant: Outdoor's Insight, Inc., Crosslake, MN (US)

(72) Inventor: Thomas Maschhoff, Crosslake, MN (US)

(73) Assignee: OUTDOOR'S INSIGHT, INC., Crosslake, MN (US)

( * ) Notice: Subject to any disclaimer, the term of this patent is extended or adjusted under 35 U.S.C. 154(b) by 107 days.

(21) Appl. No.: 15/681,693

(22) Filed: Aug. 21, 2017

(65) Prior Publication Data

US 2018/0054598 A1 Feb. 22, 2018

Related U.S. Application Data

(60) Provisional application No. 62/377,811, filed on Aug. 22, 2016.

(51) Int. Cl.
*H04N 7/18* (2006.01)
*A01K 91/08* (2006.01)
*H01B 7/04* (2006.01)
*A01K 97/00* (2006.01)

(52) U.S. Cl.
CPC .............. *H04N 7/18* (2013.01); *A01K 91/08* (2013.01); *A01K 97/00* (2013.01); *H01B 7/045* (2013.01); *H04N 7/183* (2013.01)

(58) Field of Classification Search
CPC .......... H04N 7/18; H04N 7/183; A01K 91/08; A01K 97/00; H01N 7/045
See application file for complete search history.

(56) References Cited

U.S. PATENT DOCUMENTS

| | | | | | |
|---|---|---|---|---|---|
| 4,227,479 | A | * | 10/1980 | Gertler | B63G 8/38 114/244 |
| 5,778,259 | A | * | 7/1998 | Rink | H04N 5/2252 206/316.2 |
| 6,065,123 | A | * | 5/2000 | Chou | G06F 1/3203 713/322 |
| 6,097,424 | A | * | 8/2000 | Zernov | H04N 9/47 348/373 |
| 6,262,761 | B1 | * | 7/2001 | Zernov | G03B 15/03 348/61 |
| 8,120,650 | B2 | * | 2/2012 | Laser | A01K 87/007 348/81 |
| 8,437,630 | B2 | * | 5/2013 | Wessner | A01K 91/06 396/25 |
| 8,654,189 | B1 | * | 2/2014 | Spangler | H04N 7/183 348/81 |
| 2002/0003584 | A1 | * | 1/2002 | Kossin | H04N 5/2252 348/373 |

(Continued)

*Primary Examiner* — Antoinette T Spinks
(74) *Attorney, Agent, or Firm* — Leason Ellis LLP

(57) ABSTRACT

An underwater camera assembly is configured to be dragged behind a boat underwater. The camera assembly includes a housing having a hollow interior that is configured to hold a camera in waterproof manner. The camera assembly includes at least one rail disposed along an outer surface of the housing and being configured to slidingly receive and interlockingly engage a first accessory (camera positioning fin). The camera assembly can further include a second accessory (trolling fin) that is also interlockingly, yet releasably, engaged to the housing.

20 Claims, 10 Drawing Sheets

(56) References Cited

U.S. PATENT DOCUMENTS

| | | | | |
|---|---|---|---|---|
| 2007/0128970 A1* | 6/2007 | Mietta | ............... | A63H 23/04 |
| | | | | 446/154 |
| 2008/0084496 A1* | 4/2008 | Vasilescu | ............... | G03B 13/00 |
| | | | | 348/348 |
| 2009/0207020 A1* | 8/2009 | Garnier | ............... | G08B 21/12 |
| | | | | 340/541 |
| 2010/0007148 A1* | 1/2010 | Davis | ............... | F03B 3/128 |
| | | | | 290/54 |
| 2014/0049636 A1* | 2/2014 | O'Donnell | ............... | G08C 17/02 |
| | | | | 348/143 |
| 2015/0036047 A1* | 2/2015 | Bledsoe | ............... | H04N 5/2254 |
| | | | | 348/375 |
| 2016/0360585 A1* | 12/2016 | Urry | ............... | H05B 33/0845 |

\* cited by examiner

UNDERWATER CAMERA ASSEMBLY

CROSS-REFERENCE TO RELATED PATENT APPLICATIONS

This application is based on and claims priority to U.S. Provisional Patent Application 62/377,811, filed Aug. 22, 2016, the entire contents of which is incorporated by reference herein as if expressly set forth in its respective entirety herein.

TECHNICAL FIELD

The present invention relates to an underwater camera and more particularly, to an underwater camera housing that includes quick attachment rails for coupling accessories to the camera housing.

BACKGROUND

Cameras are used in many different environments and recent technology has allowed cameras to have an ever increasing number of features and also the footprint of cameras has been decreasing as well due to this technology. In particular, one recent class of cameras that has experienced increased popularity is action cameras that are designed to be used in many different action settings. This in turn has led to a number of accessories being marketed to allow such action cameras to be used in air, land and water settings. For example, attachment accessories permit such cameras to be mounted to a drone, a car, a bicycle helmet, a water floatation device, etc.

With respect to underwater cameras, these cameras can also be used in the sport of fishing or simply to view underwater wildlife. The present invention is directed to an improved underwater camera.

SUMMARY

The present invention is directed to an underwater camera assembly that is in particular configured to be dragged behind a boat underwater. The camera assembly includes a housing having a hollow interior that is configured to hold a camera in waterproof manner. The camera assembly includes at least one rail disposed along an outer surface of the housing and being configured to slidingly receive and interlockingly engage a first accessory. In particular, the two parts can be detachably snap-fit together and the first accessory can be in the form of a camera positioning fin. The camera assembly can further include a second accessory that is also interlockingly, yet releasably, engaged to the housing. The second accessory can be in the form of a trolling fin that can be positioned along the bottom of the housing, with the camera positioning fin (first accessory) being positioned along the top of the housing.

The underwater camera assembly allows a user to watch, in real time, trolled or drifted lures and fish following and striking on a monitor (display) that is onboard the boat. The system can be configured to clip a fishing line into a clip device and towing a lure or bait directly behind the camera lens. (with the trolling fin in in a rear viewing setup). For more optimal results, the fishing line should be attached to the clip so the lure trails within 5 feet of the camera. Shallow diving crankbaits, spinners and live bait rigs, swimbaits and other soft plastics work great. When a fish strikes, the clip device releases line, freeing you to fight the fish.

BRIEF DESCRIPTION OF THE DRAWING FIGURES

BRIEF DESCRIPTION OF THE DRAWING FIGURES

The following description is directed to an underwater camera system. The referenced system is now described more fully with reference to the accompanying drawings, in which one or more illustrated embodiments and/or arrangements of the system are shown. The system is not limited in any way to the illustrated embodiments and/or arrangements as the illustrated embodiments and/or arrangements described below are merely exemplary of the present apparatuses and methods, which can be embodied in various forms as appreciated by one skilled in the art. Therefore, it is to be understood that any structural and functional details disclosed herein are not to be interpreted as limiting the present application, but rather are provided as a representative embodiment and/or arrangement for teaching one skilled in the art one or more ways to implement the present apparatuses and/or methods. Moreover, just because a certain feature is depicted in combination with a particular set of other features, no intent to so limit the invention can be inferred and each feature can be combined with any other set of other features. Accordingly, certain aspects of the present apparatuses and methods can take the form of an entirely hardware embodiment or an embodiment combining software and hardware.

Figure 1:
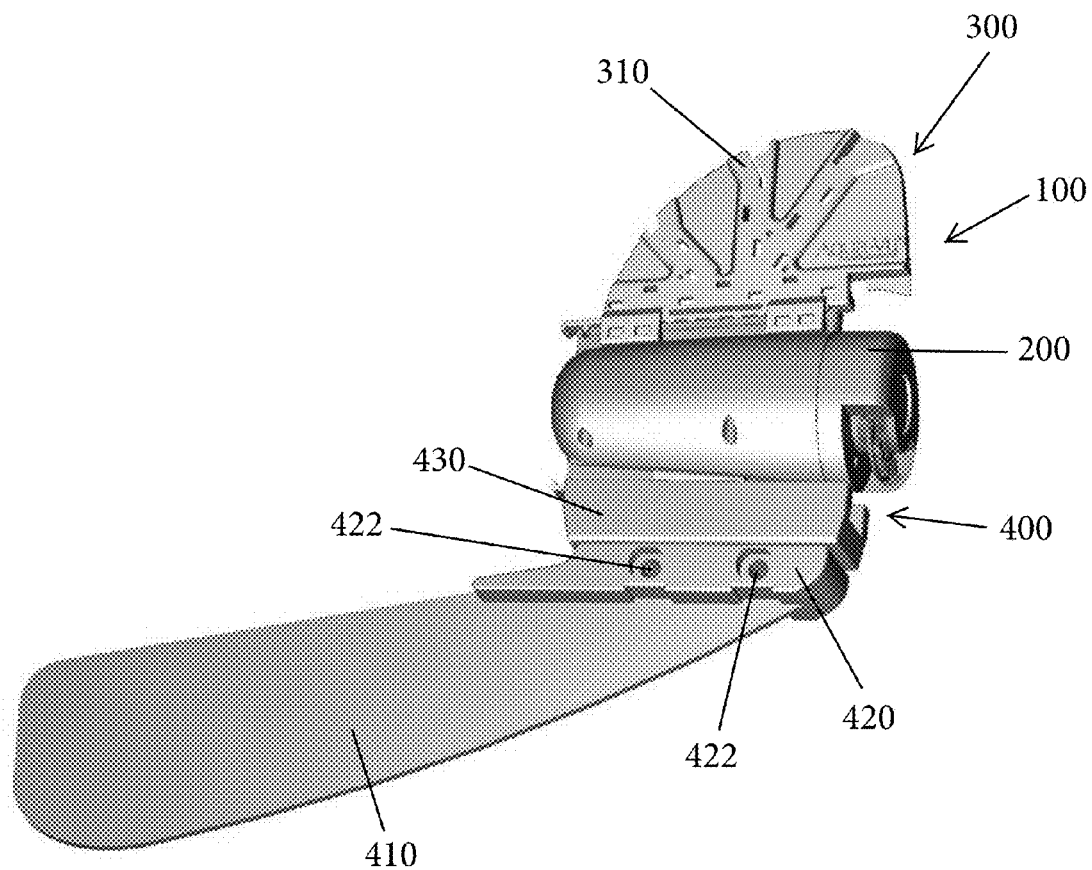
FIG. 1 is a perspective view of an underwater camera assembly according to the present invention showing two accessories attached to a housing.
Figure 2:
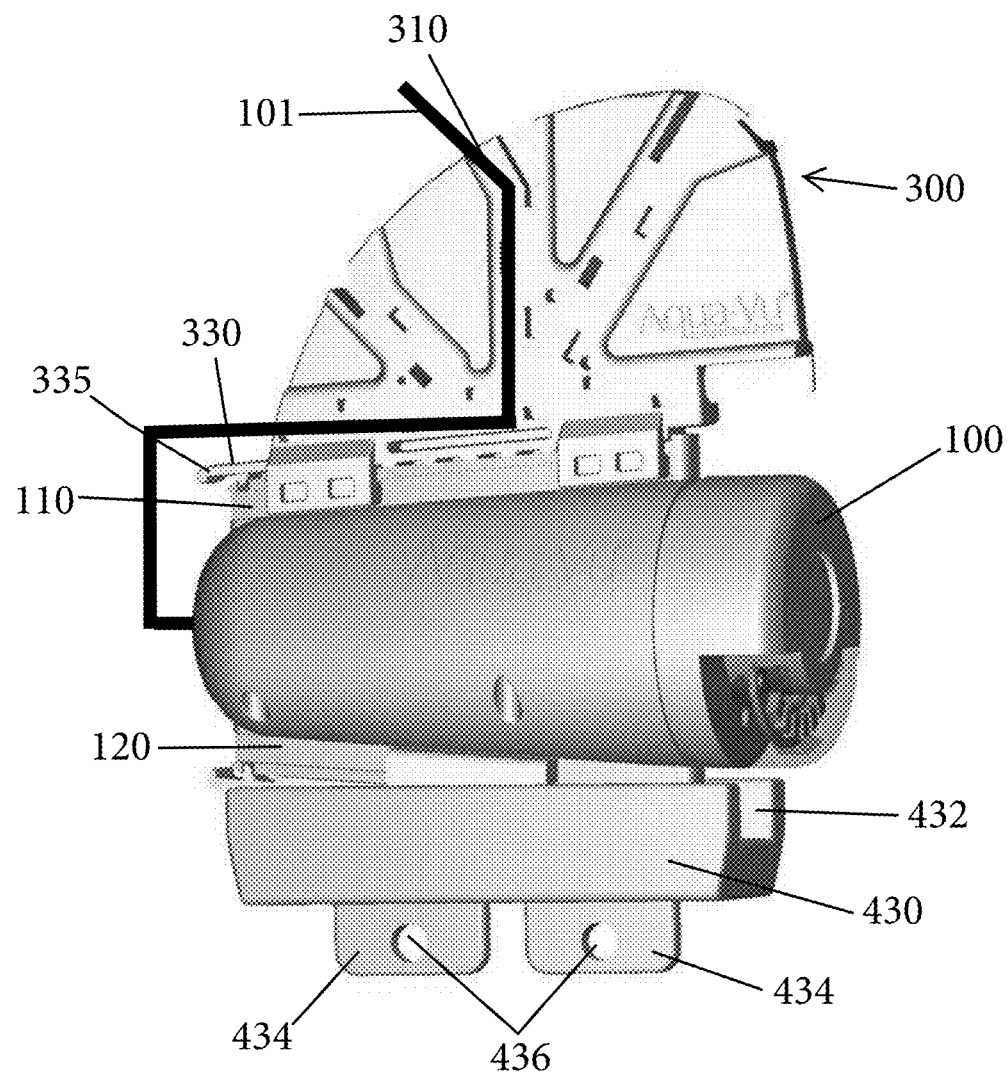
FIG. 2 is a perspective side view of the underwater camera showing parts thereof.
Figure 3:
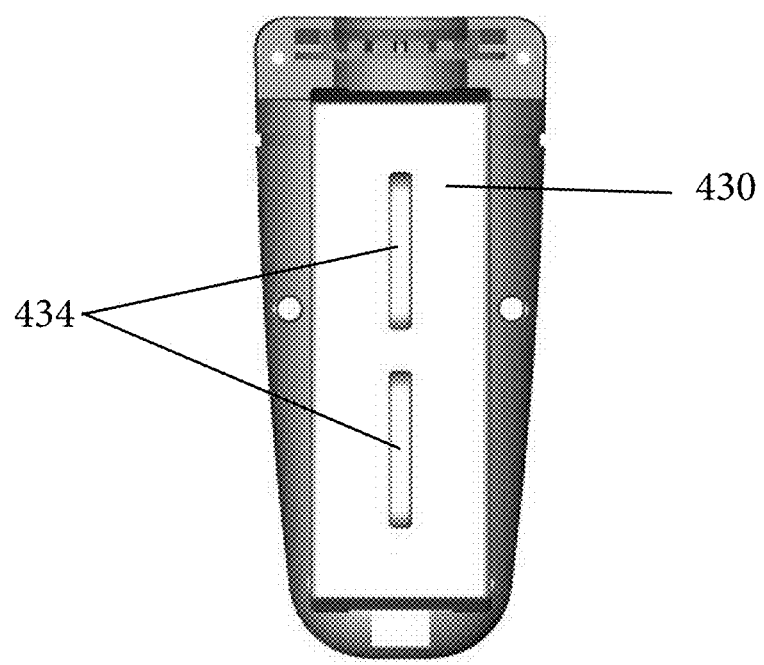
FIG. 3 is a bottom plan view of the underwater camera showing parts thereof.
Figure 4:
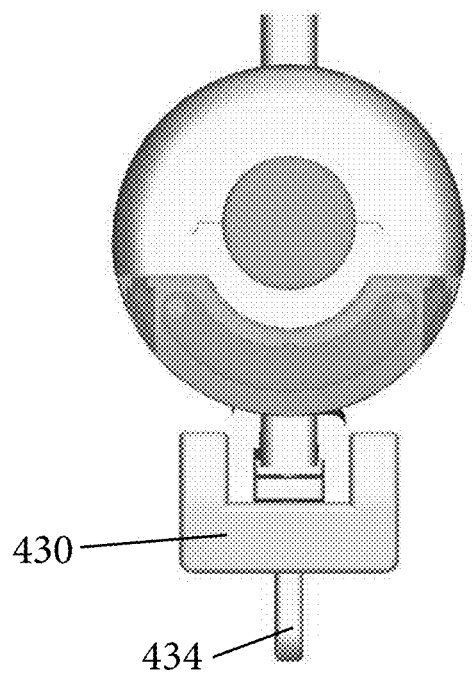
FIG. 4 is an end view of the underwater camera showing parts thereof.
Figure 5:
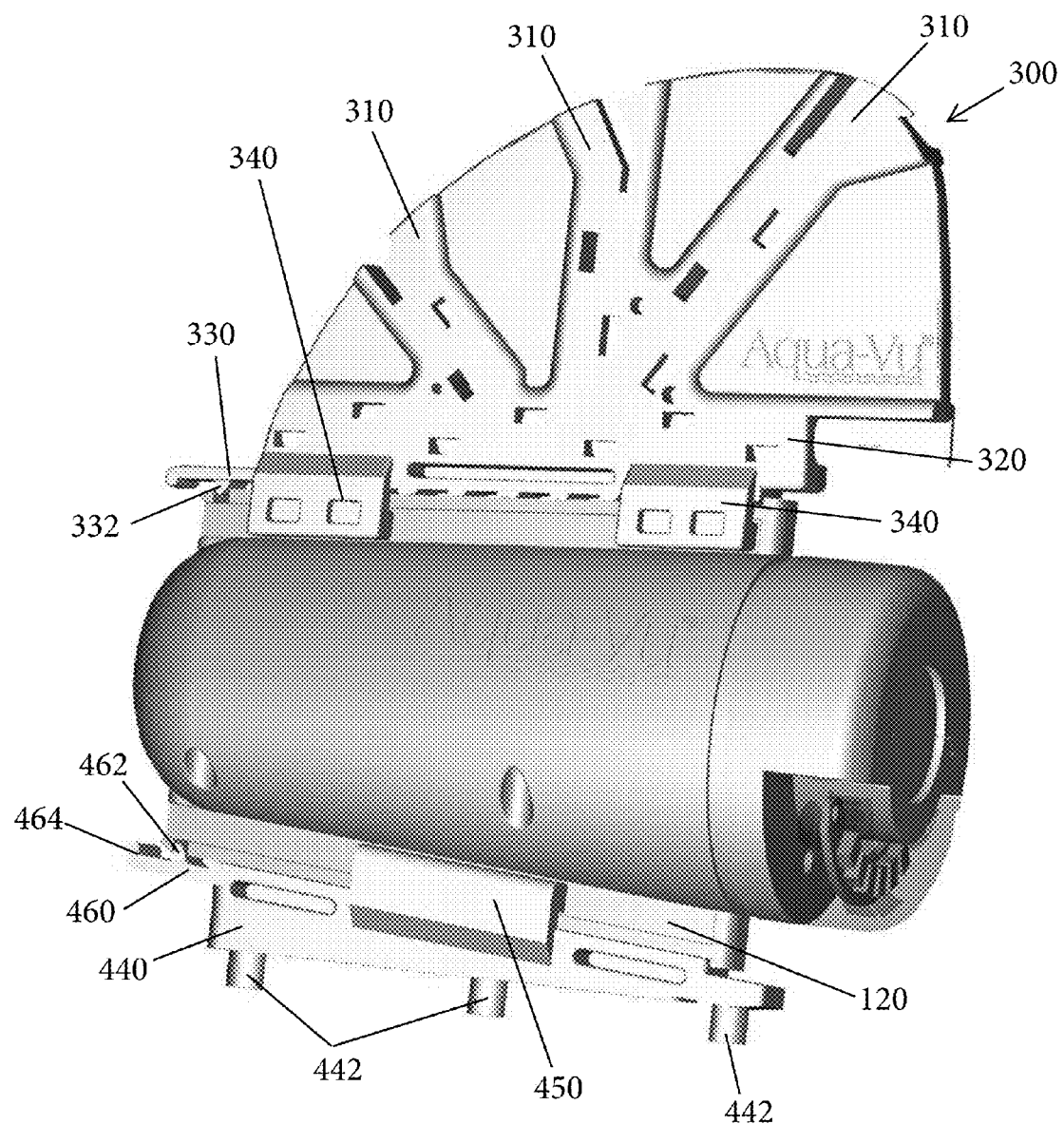
FIG. 5 is a side perspective view of the underwater camera showing parts thereof.
Figure 6:
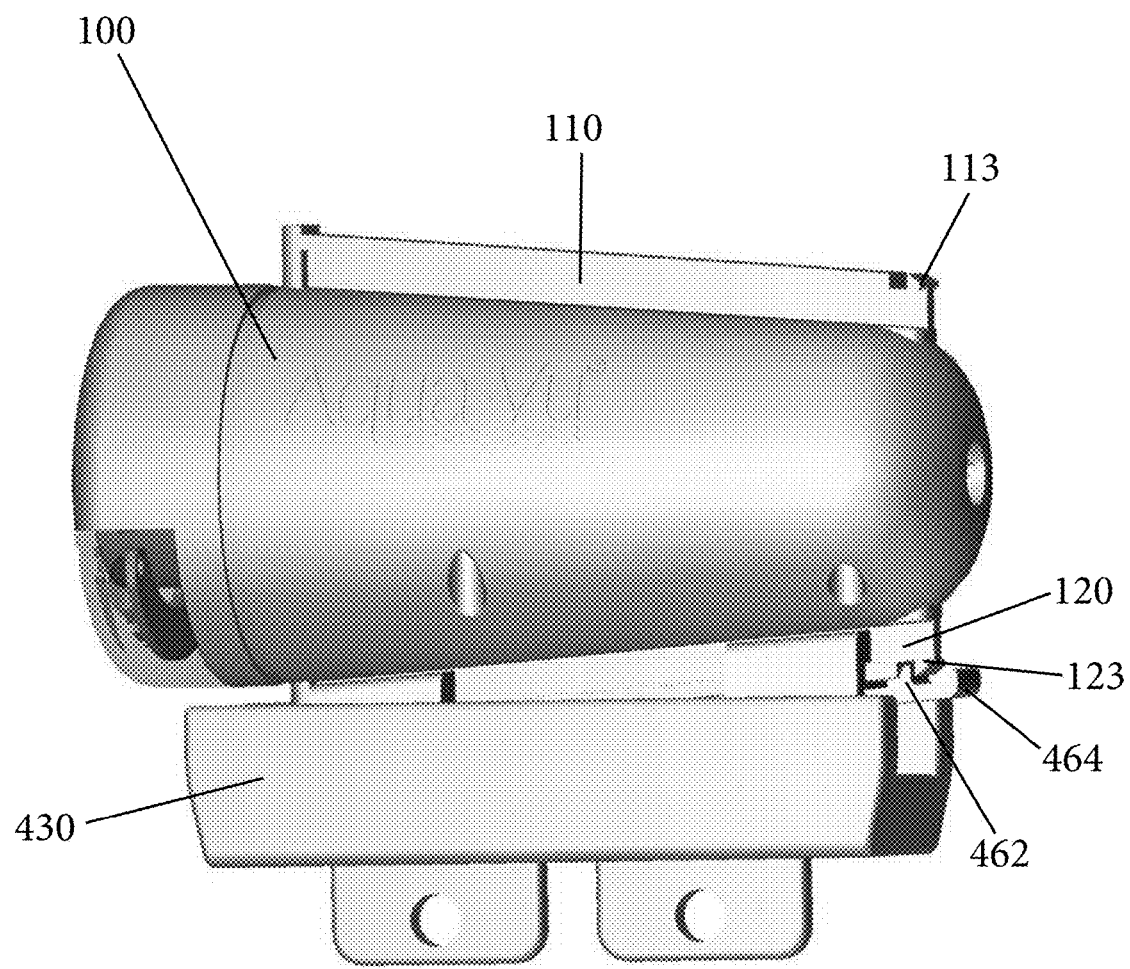
FIG. 6 is a side perspective view of the underwater camera showing parts thereof.
Figure 7:
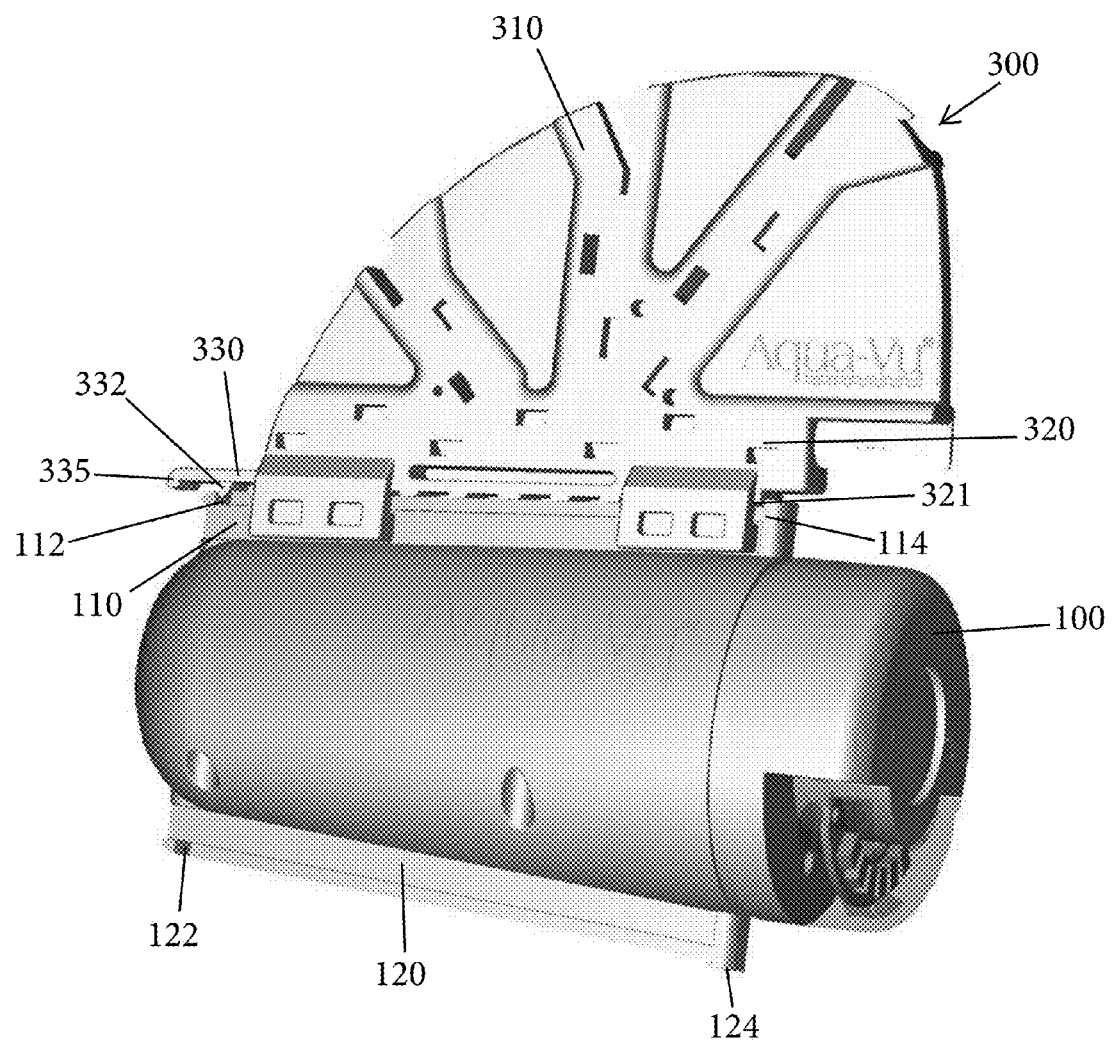
FIG. 7 is a side perspective view of the underwater camera showing parts thereof.
Figure 8:
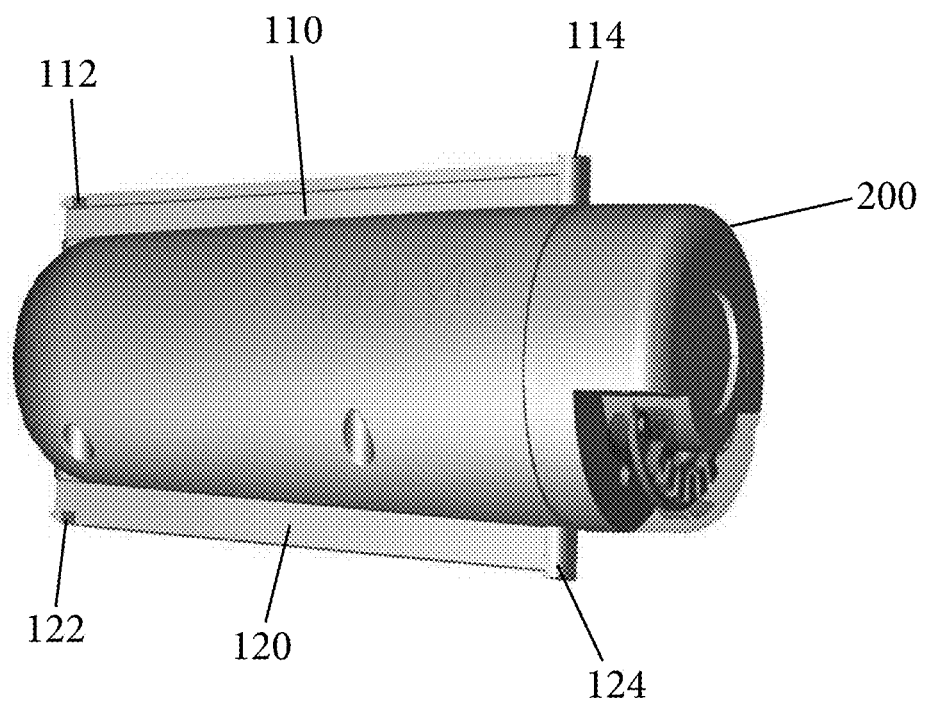
FIG. 8 is a side perspective view of the underwater camera showing parts thereof.

FIGS. 1-10 illustrate an underwater camera assembly 100 according to one embodiment of the present invention. The underwater camera assembly 100 includes a waterproof housing 200 that houses a camera; a first accessory 300 that is removably coupled to the housing 200; and a second accessory 400 that is removably coupled to the housing 200. As best shown in FIG. 8, the housing 200 includes a body which defines a hollow interior which receives and contains the camera. In the illustrated embodiment, the housing 200 is generally cylindrical in shape; however, the housing can be formed to have other shapes. The housing 200 includes a first rail 110 that extends along a length of the housing body and an opposing second rail 120 that extends along a length of the housing body. As illustrated, the first and second rails 110, 120 are disposed 180 degrees apart; however, other positions are possible and the lengths of the rails 110, 120 are shown to be at least substantially equal; however, the rails 110, 120 can have different lengths. The first and second rails 110, 120 extends radially outward from the housing body and can be formed at a right angle thereto.

The first rail 110 has a first end which can include a beveled edge (cam surface) 113 (FIG. 6) and an opposite second end that includes a stop 114. Proximate the first end, the rail includes a notch (recess) 112. Similarly, the second rail 120 has a first end which can include a beveled edge (cam surface) 123 and an opposite second end that includes a stop 124. Proximate the first end, the rail includes a notch (recess) 122.

The housing 200 can be in the form of a two piece metal housing with an incorporated cable strain relief feature.

As described herein, the first and second rails 110, 120 are configured to act as quick attachment rails to allow a user to easily and quickly both couple and detach an accessory (e.g., accessories 300, 400) to the housing.

A cable 101 is provided and is connected to the camera electronics within the housing 200. Thus, one end of the cable 101 is operatively connected to the camera assembly 100, while the opposite end can be connected to a monitor (display) (not shown) that is typically contained onboard the boat to allow easy viewing of the underwater images captured by the camera 100.

The first accessory 300 is in the form of a camera viewing angle positioning fin. The first accessory 300 is formed of a body (e.g., a molded plastic piece) that includes internal channels 310 that exit at various points along a peripheral edge of the body of the first accessory 300. The channels 310 are formed at different angles relative to the housing 200 to which the first accessory 300 is coupled and this permits the camera assembly 100 to be held (suspended) at different angles depending upon which channel 310 the cable is inserted and contained. For example, the camera assembly 100 can be pointed downward or upward by selecting the proper channel 310 to insert the cable 101. By exiting at different points, the channels 310 provide a range of views nearly 180 degrees of vertical and recessed areas to hold the camera cable 101.

Figure 9:
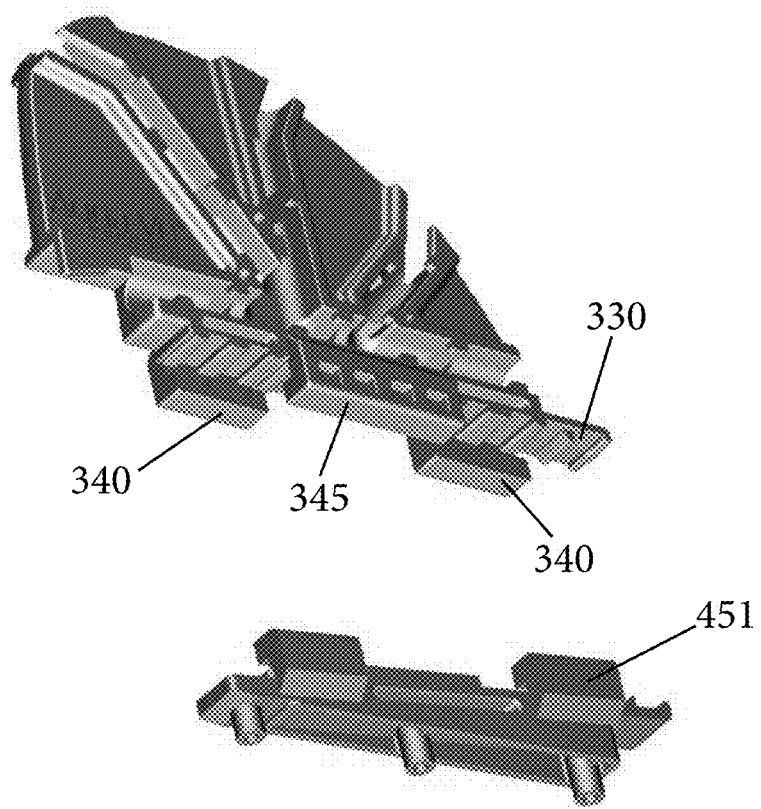
FIG. 9 is a side perspective view of the underwater camera showing parts thereof.

The first accessory 310 include an upper fin portion (curvilinear in shape) and a base section 320 that defines a rail 330. Along a bottom edge of the base section 320, a number of protrusions (guide tabs) are formed and in particular, as shown in FIG. 9, a pair of first protrusions (guide tabs) 340 are formed along and extend outwardly from one edge of the rail 330 and a single second protrusion (guide tab) 345 is formed along and extends downwardly from the opposite edge of the rail 330. As shown, the bottom exposed surface of rail 330 can include ribs to enhance surface interaction with the housing 200. Between the pair of first protrusions 340 and the second protrusion 345, a space (gap) is formed.

At one end of the flexible rail 330, is a lever 335 is formed and a locking tab 332 is formed along an underside of the rail 330.

To couple the first accessory 300 to the housing 200 in a quick connect manner, a forward edge of the rail (opposite the lever 335) is aligned with the first end of the first rail 110 and the first rail 110 is fed into the space between the first protrusions 340 and the second protrusion 345 so as to position the underside of the rail 330 along a top surface of the first rail 110. Cam surface (beveled edge) 113 can assist in initially feeding the first accessory 300 along the first rail 110. The first accessory 300 is continuously moved in a forward direction along the first rail 110 (with the first protrusions 340 and the second protrusion 345 sliding along the sides of the first rail 110) until a forward edge of the rail 330 abuts the stop 114 and at the same time, the locking tab 332 seats within locking notch (recess) 112 formed in the first rail 110, thereby securely locking the first accessory 300 to the first rail 110. In other words, a snap-fit results between the first accessory 300 and the first rail 110. Auditory and/or tactile feedback is provided to the user to signal the mating between the first accessory 300 and the first rail 110.

To remove the first accessory 300 from the housing 200, the user simply lifts the lever 335 to disengage the locking tab 332 from the locking notch 112. The user can than slide the first accessory 300 in a rearward direction along the first rail 110 to completely disengage and separate the two.

Similar to the first accessory 300, the second accessory 400 is also removably coupled to the housing 200 using a quick connect rail, in this case rail 120 of housing 200.

The second accessory 400 is in the form of a trolling fin. The trolling fin can in part be formed as a plastic molded piece attached to a weight.

The illustrated second accessory 400 is formed as an assembly on parts and in particular, is formed of a fin part 410; a fin connector part (bracket) 430 and a rail coupling part 440. The fin part 410 is in the form of an elongated fin that includes at one end a partially hollow connector portion 420. The connector portion 420 can have increased thickness relative to the rest of the fin portion 410 and, as shown, can have a pair of openings 422 formed therethrough. The fin portion 410 can be formed as a molded plastic piece.

The first connector part 430 is generally in the form of a bracket that attaches to the fin portion 410 and can be formed of metal to provide weight to the trolling fin assembly. As shown in the figures, the first connector part 430 is defined by a body that has a channel 432 formed longitudinally therethrough. The channel 432 is open at both of its ends. As shown, the channel 432 can be formed by two opposing parallel spaced walls. Along a bottom surface of the body of the first connector part 430, a pair of tabs 434 is formed. The tabs 434 are spaced apart from one another and can be formed perpendicular to the bottom surface of the body of the first connector part 430. Each of the tabs 434 includes a through hole (opening) 436. The tabs 434 are constructed to fit within one or more slots (recesses) formed in the connector portion 420. More specifically, the tabs 434 are inserted into the connector portion 420 such that the openings 422, 436 are axially aligned so as to allow a fastener to be received therethrough for coupling the fin portion 410 to the first connector part 430.

The third part of the second accessory 400 is the rail coupling part 440 which slidingly engages the second rail 120. The rail coupling part 440 is defined by a body that includes a rail portion 460 that defines an upper surface of the body and is defined by a planar surface. Along an underside of the body of the rail coupling part 440 are a plurality of posts 442 or fasteners. For example, the posts 442 can be threaded posts in that each includes a threaded bore.

Figure 10:
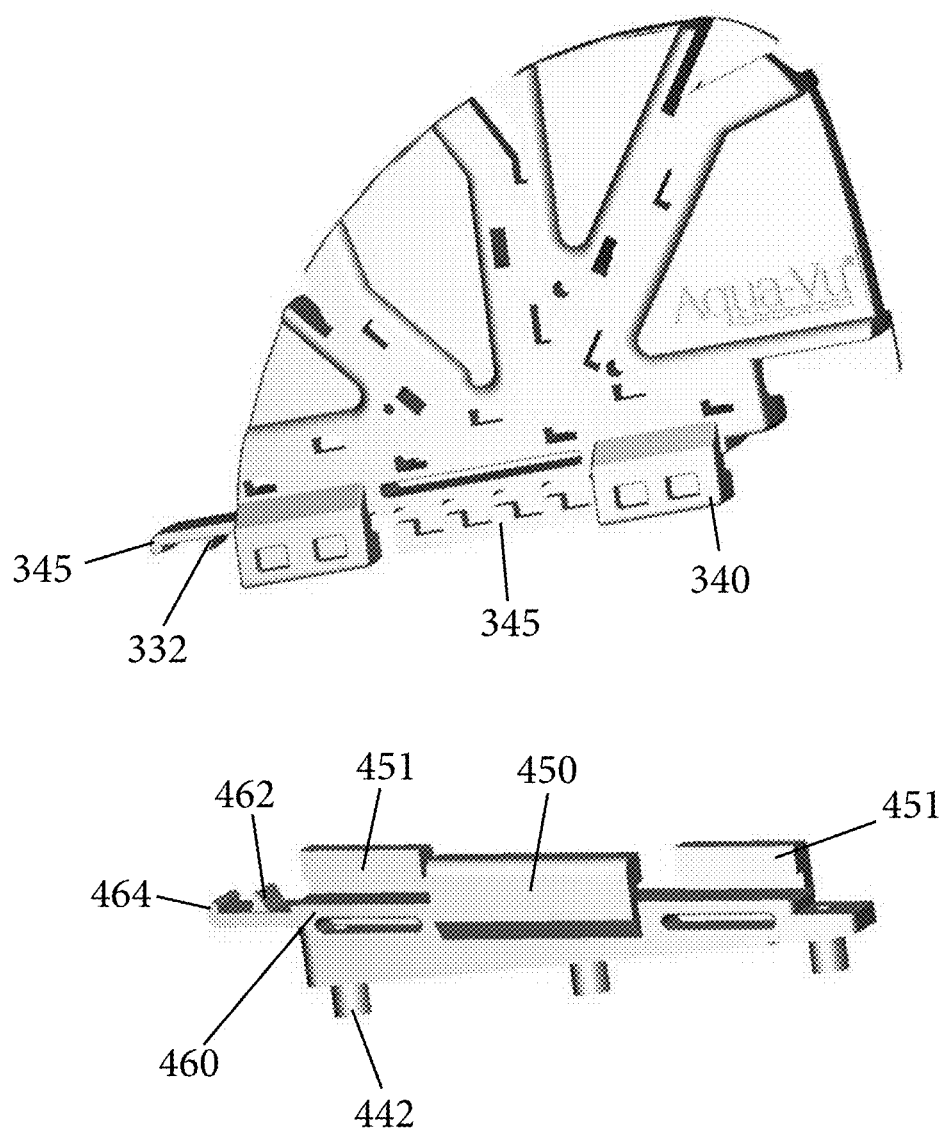
FIG. 10 is a side perspective view of the underwater camera showing parts thereof.

Along the rail portion 460, there is a lever 464 formed at one end and proximate the lever 464 is a locking tab 462. As shown in FIG. 10, the rail coupling part 440 also includes a number of protrusions (guide tabs) that are formed and in particular, a pair of first protrusions 451 are formed along and extend outwardly from one edge of the rail portion 460 and a single second protrusion (guide tab) 450 is formed along and extends outwardly from the opposite edge of the rail portion 460. Between the pair of first protrusions (guide tab) 451 and the second protrusion 450, a space (gap) is formed.

The rail coupling part 440 is coupled to the first connector part 430 by inserting the posts 442 into the channel 432 formed in the first connector part 430 and more specifically, within the channel 432, there can be a plurality of openings formed through a floor of the channel 432. For example, there can be three openings with one tab 434 between two openings and the other tab 434 between two openings. The posts 442 are aligned with these openings formed in the floor of the channel 432 and fasteners can be inserted into the underside of the first connector part 430 through the channel 432 and threadingly mate with the threaded posts 442 to secure the two structures together. It will be understood that the floor of the channel 432 can include countersunk recesses to receive and locate the posts 442, with the countersunk recesses including openings to permit fasteners to pass through. It will be understood that other means can be used to attach these two parts to one another.

To couple the second accessory 400 to the housing 200 in a quick connect manner, a forward edge of the rail portion 460 (opposite the lever 464) is aligned with the first end of the second rail 120 and the second rail 120 is fed into the space between the first protrusions 451 and the second protrusion 450 so as to position the topside of the rail portion 460 along a bottom surface of the second rail 120. Cam surface 123 can assist in initially feeding the second accessory 400 along the second rail 120. The second accessory 400 is continuously moved in a forward direction along the second rail 120 (with the first protrusions 451 and the second protrusion 450 sliding along the sides of the second rail 120) until a forward edge of the rail portion 460 abuts the stop 124 and at the same time, the locking tab 462 seats within locking notch (recess) 122 formed in the second rail 120, thereby securely locking the second accessory 400 to the second rail 120. In other words, a snap-fit results between the second accessory 400 and the second rail 120. Auditory and/or tactile feedback is provided to the user to signal the mating between the second accessory 400 and the second rail 120.

To remove the second accessory 400 from the housing 200, the user simply lifts the lever 464 to disengage the locking tab 462 from the locking notch 122. The user can than slide the second accessory in a rearward direction along the second rail 120 to completely disengage and separate the two.

It will be appreciated that the guide tabs 340, 345, 450, 451 also provide stability to the sliding coupling between the parts and prevent flexing and bending and possible disengagement of the fins due to a laterally applied force.

It will also be understood that the fin portion 410 of the second accessory 400 can be installed forward or backward with fasteners (screws) in order to allow the camera to look forward or backward while trolling.

It will also be appreciated that the manner of attachment between the accessories 300, 400 and the assembly 100 can be reversed from the disclosed manner. In other words, the positioning fin 300 can instead include a locking rail and the trolling fin 400 can instead include another locking rail and the locking slots can be incorporated in the housing 200 with one set for receiving the locking rail of the positioning fin 300 and the other set for receiving the other locking rail of the trolling fin 400.

Thus, in one embodiment, the present invention is directed to an underwater camera assembly that includes a camera sealed in waterproof housing that includes at least one and preferably a plurality of rails for quick attachment of accessories connected via cable to a monitor, WIFI encoder or recording device. In addition, the assembly can include visible lights and/or IR lights.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. An underwater camera assembly comprising:
   a housing having a hollow interior that is configured to hold a camera in waterproof manner; and
   at least one rail disposed along and protruding from an outer surface of the housing and being configured to slidingly receive and interlockingly engage a first accessory such that the first accessory protrudes outwardly from the housing and the first accessory is detachable from the housing for removal therefrom.

2. The underwater camera assembly of claim 1, wherein the at least one rail comprises a first rail and a second rail each of which is disposed along the outer surface of the housing.

3. The underwater camera assembly of claim 2, wherein the first and second rails are disposed opposite one another along the outer surface of the housing.

4. The underwater camera assembly of claim 2, wherein the housing has an at least substantially cylindrical shape and the first and second rails are located 180 degrees apart.

5. The underwater camera assembly of claim 1, wherein the at least one rail includes an integral stop at a first end and a locking notch proximate the first end and the first accessory includes a locking tab that is interlockingly received within the locking notch for lockingly coupling the first accessory to the housing.

6. The underwater camera assembly of claim 5, wherein the first accessory includes a flexible lever for disengaging the locking tab from the locking notch, the locking tab protruding outwardly from the lever.

7. The underwater camera assembly of claim 1, wherein the first accessory comprises a camera positioning fin having a fin shaped body.

8. The underwater camera assembly of claim 1, wherein the at least one rail comprises a first rail that interlocking engages the first accessory and a second rail that interlockingly engages a second accessory, the first accessory and the second accessory being spaced apart from one another.

9. The underwater camera assembly of claim 8, wherein the first accessory comprises a camera positioning fin positioning along a top of the housing and the second accessory comprises a trolling fin positioned along a bottom of the housing.

10. An underwater camera assembly comprising:
a housing having a hollow interior that is configured to hold a camera in waterproof manner; and
at least one rail disposed along an outer surface of the housing and being configured to slidingly receive and interlockingly engage a first accessory that comprises a camera positioning fin having a fin shaped body;
wherein the first accessory includes a rail structure that seats against the at least one rail of the housing and includes at least one first guide tab formed along one side of the rail structure and at least one second guide tab formed along another side of the rail structure such that when the first accessory interlockingly engages the at least one rail, the at least one first guide tab is disposed along one side of the at least one rail and the at least one second guide tab is disposed along another side of the at least one rail.

11. The underwater camera assembly of claim 7, wherein the camera positioning rib includes integral angled channels formed therein for receiving and positioning a cable that is operatively connected to the camera and permit the cable to be routed upward to boat.

12. The underwater camera assembly of claim 11, wherein the angled channels are formed so as to alter the position of the camera depending upon which channel receives the cable since the underwater camera assembly is suspended by the cable.

13. The underwater camera assembly of claim 1, wherein the at least one accessory comprises a trolling fin.

14. The underwater camera assembly of claim 13, wherein the trolling fin comprises a fin portion; a first connector part, and a rail coupling part, the fin portion being detachably coupled to the first connector part and the first connector part being fixedly coupled to the rail coupling part, the rail coupling part being configured to slidingly travel along the at least one rail until an engagement position is achieved therebetween.

15. The underwater camera assembly of claim 14, wherein the at least one rail includes an integral stop at one end and a locking notch and the rail coupling part includes a locking tab that is interlockingly received within the locking notch.

16. The underwater camera assembly of claim 15, wherein the rail coupling part includes a lever proximate the locking tab for disengaging the locking tab from the locking notch.

17. The underwater camera assembly of claim 14, wherein the fin portion and the first connector part are coupled to one another with fasteners.

18. The underwater camera assembly of claim 14, wherein the rail portion that seats against the at least one rail of the housing includes at least one first guide tab formed along one side of the rail portion and at least one second guide tab formed along another side of the rail portion such that when the first accessory interlockingly engages the at least one rail, the at least one first guide tab is disposed along one side of the at least one rail and the at least one second guide tab is disposed along another side of the at least one rail.

19. An underwater camera assembly comprising:
a housing having a hollow interior that is configured to hold a camera in waterproof manner, the housing having a first locking rail extending longitudinally along a top a of the housing and a second locking rail extending longitudinally along a bottom of the housing;
a camera positioning fin that includes a fin body and a lower locking rail that is disposed between at least one first guide tab disposed along a first side of the lower locking rail and at least one second guide tab that is disposed along a second side of the lower locking rail, wherein one end of the lower locking rail comprises a flexible lever with a first locking tab protruding downwardly therefrom, the first locking rail for reception between the at least one first guide tab and the at least one second tab and the first locking tab for reception within a notch formed in the first locking rail to detachably couple the camera positioning fin to the housing; and
a trolling fin that includes a fin body and an upper locking rail that is disposed between at least one third guide tab disposed along a first side of the upper locking rail and at least one second guide tab that is disposed along a second guide tab that is disposed a second side of the upper locking rail, wherein one end of the upper locking rail comprises a flexible lever with a second locking tab protruding upwardly therefrom the second locking rail for reception between the at least one third guide tab and the at least one fourth tab and the second locking tab for reception within a notch formed in the second locking rail to detachably couple the trolling fin to the housing.

20. The underwater camera assembly of claim 19, wherein the upper locking rail, the at least one third guide tab, and the at least one fourth guide are part of a rail coupling part that is a separate part relative to the fin body of the trolling fin, the upper locking rail includes one or more coupling posts that are received within a hole formed in a channel formed in a first connector part that is a separate part relative to the rail coupling part, the first connector part in including one or more downwardly extending tabs each of which has a through hole formed therein, the trolling fin further including a hollow connector portion that includes at least one recess that receives one downwardly extending tab, the hollow connector portion having at least one hole that aligns each of which aligns with one of the through holes for coupling the first connector part to the hollow connector portion.

* * * * *

UNITED STATES PATENT AND TRADEMARK OFFICE
CERTIFICATE OF CORRECTION

PATENT NO.        : 10,516,854 B2
APPLICATION NO.   : 15/681693
DATED             : December 24, 2019
INVENTOR(S)       : Thomas Maschhoff It is certified that error appears in the above-identified patent and that said Letters Patent is hereby corrected as shown below:

In the Claims

Column 7, Lines 46-50, Claim 11: the text "The underwater camera assembly of claim 7, wherein the camera positioning rib includes integral angled channels formed therein for receiving and positioning a cable that is operatively connected to the camera and permit the cable to be routed upward to boat." should read -- The underwater camera assembly of claim 7, wherein the camera positioning fin includes integral angled channels formed therein for receiving and positioning a cable that is operatively connected to the camera and permit the cable to be routed upward to a boat. --

Signed and Sealed this
Twelfth Day of January, 2021

Andrei Iancu
*Director of the United States Patent and Trademark Office*